(12) United States Patent
Reuben

(10) Patent No.: US 10,946,412 B2
(45) Date of Patent: Mar. 16, 2021

(54) THERMALLY INSULATING SHEET FORMED FROM A DOWN CORE STRUCTURE AND METHOD OF FABRICATION

(71) Applicant: Ronie Reuben, Town of Mount Royal (CA)

(72) Inventor: Ronie Reuben, Town of Mount Royal (CA)

( * ) Notice: Subject to any disclaimer, the term of this patent is extended or adjusted under 35 U.S.C. 154(b) by 430 days.

(21) Appl. No.: 15/932,579

(22) Filed: Mar. 19, 2018

(65) Prior Publication Data
US 2019/0283078 A1 Sep. 19, 2019

(51) Int. Cl.
| | | |
|---|---|---|
| *B05D 3/04* | (2006.01) | |
| *B05D 1/26* | (2006.01) | |
| *B32B 5/02* | (2006.01) | |
| *B68G 3/08* | (2006.01) | |
| *B32B 9/04* | (2006.01) | |
| *B60R 13/08* | (2006.01) | |
| *D04H 1/559* | (2012.01) | |
| *D04H 1/60* | (2006.01) | |

(52) U.S. Cl.
CPC .......... *B05D 3/0426* (2013.01); *B05D 1/265* (2013.01); *B32B 5/028* (2013.01); *B32B 9/047* (2013.01); *B68G 3/08* (2013.01); *B60R 13/0815* (2013.01); *D04H 1/559* (2013.01); *D04H 1/60* (2013.01)

(58) Field of Classification Search
CPC ...................................................... B05D 1/265
See application file for complete search history.

(56) References Cited

U.S. PATENT DOCUMENTS

| | | | | |
|---|---|---|---|---|
| 2004/0126580 | A1* | 7/2004 | Gaignard | ............. D04H 1/4266 428/373 |
| 2011/0240210 | A1* | 10/2011 | Terakawa | ................. D04H 1/54 156/181 |
| 2015/0165724 | A1* | 6/2015 | Cox | .......................... B32B 3/12 428/573 |
| 2015/0196145 | A1* | 7/2015 | Reuben | ................... B32B 5/022 5/502 |

* cited by examiner

*Primary Examiner* — Matthew J Daniels
*Assistant Examiner* — Wayne K. Swier
(74) *Attorney, Agent, or Firm* — Guy J. Houle; Houle Patent Agency Inc.

(57) ABSTRACT

A thermally insulating sheet formed by a down core structure which is comprised solely of down feather material mixed with binding material which is heat fused together to form a homogeneous sheet core. The method of fabricating the homogeneous thermally insulating sheet to form the down core structure is described. This novel method restrains the down clusters and binding material during the process of mixing, depositing, conveying and heat fusing to form a homogeneous down core sheet. The down core structure is subjected to two separate heat treatments which produces a down core sheet having at least some of its outer surfaces being of higher bond density than the inside of the core.

9 Claims, 4 Drawing Sheets

THERMALLY INSULATING SHEET FORMED FROM A DOWN CORE STRUCTURE AND METHOD OF FABRICATION

TECHNICAL FIELD

The present invention relates to a thermally insulating sheet formed from a down core structure and a method of fabrication of the down core sheet.

BACKGROUND ART

In my U.S. Pat. No. 6,025,041 I describe a first generation down feather sheet and wherein the down feathers are retained in a homogeneous form by a chemical binder agent or rigid fibers and further wherein the down feathers are exposed on all sides of the sheet. A primary purpose of that down feather sheet was to provide a sheet of down feathers for use by the apparel fabricating industry as superior insulation in garments. Such a down feather sheet provided a substantially constant distribution of the down feathers and thus prevented the development of cold spots in the insulation. Because the down feathers are exposed in all outer surfaces of the down feather sheet extra care was necessary to prevent the down feathers from detaching from the faces of the sheet or patterns cut from the sheet.

There is a need to develop a down feather sheet for use in many other applications to provide improved thermal insulation, such as in the construction of vehicles where the passenger enclosure which is climatically controlled during hot or cold weather condition needs to be well insulated. Countless other applications exist as one can imagine. However, for such commercial use, as well as in the fabrication of articles of apparel, there is a need to retain the down feathers captive in the sheets or patterns and to make down feather sheet stretchable (elastic) whereby it can be stretched during installation or use when the need arises to do so.

Another problem with down insulating products, such as articles of apparel is that when such articles are washed in a washing machine, the down has a tendency to form clumps and the minute down clusters can come out of the lining fabric. Ideally, such products should be dry cleaned but still the down clusters, being very small and unstable, can be drawn out of the lining fabric. Such affects the insulating quality and the aesthetic appearance of the garment.

More recently, such down feather sheets have been held captive between sheets of non-woven fabrics adhered to opposed top and bottom surfaces of the sheets and held thereto by a glue binder present at the interface with the down sheet. Although, that solution did prevent some escapement of the down feathers, it did not provide for the use of such material in other industrial manufacturing applications as the material, although flexible did not provide for stretching of the sheet to attach it to flexible and rigid shaped objects and in restricted spaces where it is necessary for the sheet to stretch. Also, when used in garments in areas where movement is required such as in underarm areas or knee areas of clothing, rigid down insulating sheets when stretched would tear to form clumps of insulation which would gather in specific areas and become visible to the eye and form cold spots in the garment. Therefore, that improvement did not overcome these existing problems to extend the use of such down feather sheets.

It is desirable to form a down feather sheet comprised of a core mixture of down feather material with a binder as described in my above mentioned patent. However, I have found that because the down clusters are very unstable and difficult to manipulate, and particularly so if conveyed in a thermal chamber or oven without a scrim sheet on the top surface thereof, the air flow in the chamber causes the down clusters to disperse from the surfaces of the sheet of loose down feather making it impossible to produce a homogeneous sheet solely of down feathers and a binder material mixture.

SUMMARY OF THE INVENTION

It is a feature of the present invention is to provide a thermally insulating sheet formed solely by a down core structure and a method of fabricating same.

Another feature of the present invention is to provide a method of fabricating a homogeneous thermally insulating sheet comprised of a mixture of down feather material mixed with a binding material in predetermined proportions and heat set together while overcoming the above mentioned disadvantages of not using scrim sheets to retain the mixture captive.

It is a further feature of the present invention to provide a thermally insulating down sheet formed by a core structure which is breathable, soft, lightweight, and without the use of scrim sheets while substantially preventing the escape of down clusters from the opposed surfaces and side surfaces of the down sheet.

Another feature of the present invention is to provide a down sheet formed from down down material bonded together by glue particles and/or polymer fibers mixed in predetermined proportions to form a down core sheet and wherein the top outer surface and side surfaces of the down core sheet has a higher bond density than the inner area of the core.

According to the above features, from a broad aspect of the present invention, there is provided a thermally insulating sheet formed by a down core structure comprised of down clusters mixed with binding material which when subjected to heat is capable of bonding together to form a homogeneous core sheet. The down cluster each have a central quill with fluffy tentacles projecting therefrom in all directions creating a three-dimensional cluster structure which traps air. The clusters attach to one another by their tentacles and the binder material. The binding material is comprised of glue particles and/or polymer fibers, with the polymer fibers having a low melting point in the range of from about 80 degrees C. to 160 degrees C., and wherein said down core has at least some bonded outer surface of higher bond density than the inner core.

According to another broad aspect, the present invention provides a method of fabricating a homogeneous thermally insulating sheet formed by a down core structure, the method comprising the steps of:
i) Mixing in a mixing chamber down feather material with a binding material in predetermined proportions. The binding material is comprised of glue particles and/or polymer fibers having a low melting point in the range of from about 80 degrees C. to 160 degrees C.
ii) Displacing a conveyor belt having a non-stick surface under an outlet opening of the mixing chamber.
iii) Releasing predetermined quantities of the mixture of down feather material and binding material from the outlet opening onto the non-stick surface of the conveyor belt when the conveyor belt is in motion to form a sheet layer of the mixture.

iv) Restraining the sheet layer of said mixture as it is conveyed from the outlet opening to a thermal chamber to subject the mixture to a temperature sufficient to heat bond at least some of the surfaces of the mixture, and v) Releasing the restrainment.

DESCRIPTION OF THE DRAWINGS

A preferred embodiment of the present invention will now be described with reference to the accompanying drawings in which.

DETAILED DESCRIPTION OF THE PREFERRED EMBODIMENTS

Figure 1A:
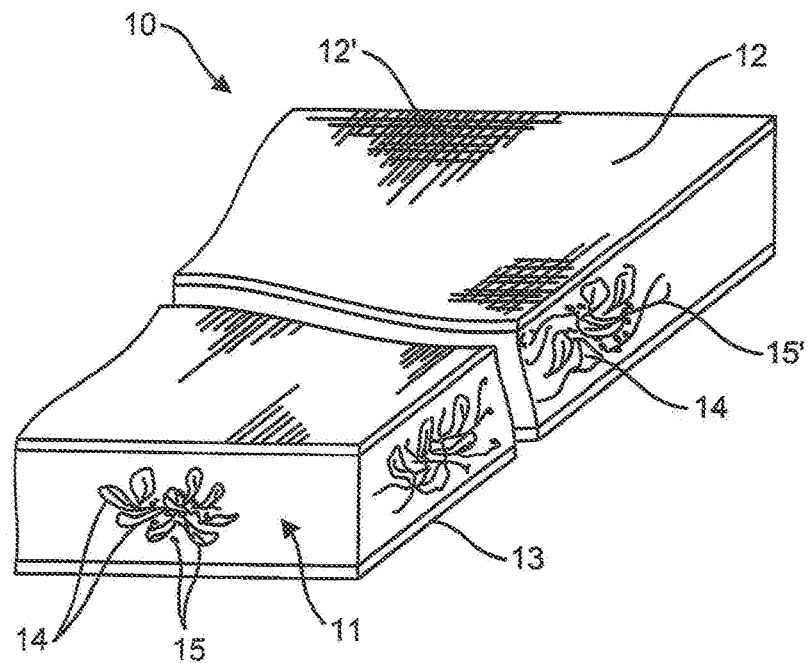
FIG. 1A is a fragmented perspective view of a thermally insulating stretchable down sheet constructed in accordance with the present invention and illustrating two types of elastomeric outer sheets and different types of binding techniques.

Referring now to the drawings, and particularly to FIG. 1A, there is shown at 10 a thermally insulating stretchable down sheet. It is comprised of a stretchable down core 11 sandwiched between and bonded to a top and a bottom multi-directional stretchable elastomeric sheet 12 and 13, respectively, made from woven or non-woven fibers. The core 11 is comprised of down clusters 14 mixed with a stretchable binder 15, in predetermined proportions. The binder 15 is a mixture of an elastic glue and stretchable polyester fibers capable of bonding when heat treated whereby to form a homogeneous thermally insulating down core which exhibits elastic properties permitting it to stretch with the elastomeric sheets with no or minimal fracture to the core.

The expression "elastomeric" as used herein is meant to have the meaning of elastic or stretchable wherein the core formed of down and the elastic binder is capable of recovering substantially its original relaxed form after stretching or deformation. Also, the elastomeric sheets may be woven or non-woven in the form of films, nettings, and the like, and are basically isotropic, exhibiting essentially the same properties in all directions of their two dimensional plane. Such elastomeric goods as utilized with the present invention are for example polyurethane resins which are capable of fusing when subjected to heating whereby to bond. Some elastic polymer filaments 15' are formed from styrene strands and some may exhibit an elongation to break of at least 200%, and when released from stretching retreats to about 125% of its original length. Many of such fibers or filaments and nonwovens are currently available in the trade. Webs made thereof provide excellent stretchable characteristics, breathability, softness, lightweight and weathering resistance.

The elastomeric, multi-directional, stretchable sheets 12 and 13 may also be in the form of netting, as mentioned above and as denoted by reference numeral 12' in FIG. 1A and comprised of polymer filaments produced by extrusion streams to form a regular array of weft and warp stretchable filaments bonded together at their crossings to produce a net which exhibits multi-directional stretching. For example, such netting may be fabricated from Nylon 6 and polypropylene. These nettings are all known in the art and for example disclosed in U.S. Pat. No. 4,636,419, the disclosure of which is herein incorporated by reference. U.S. Pat. No. 4,241,123 also discloses a non-woven netting formed by a first group of melting monofilaments and a second group of monofilaments or a yarn which is crossed, pressed and heat welded to form a fiber stand netting capable of softening under heat treatment to bond to the core 11 and has the capability to stretch in all directions.

Figure 1B:
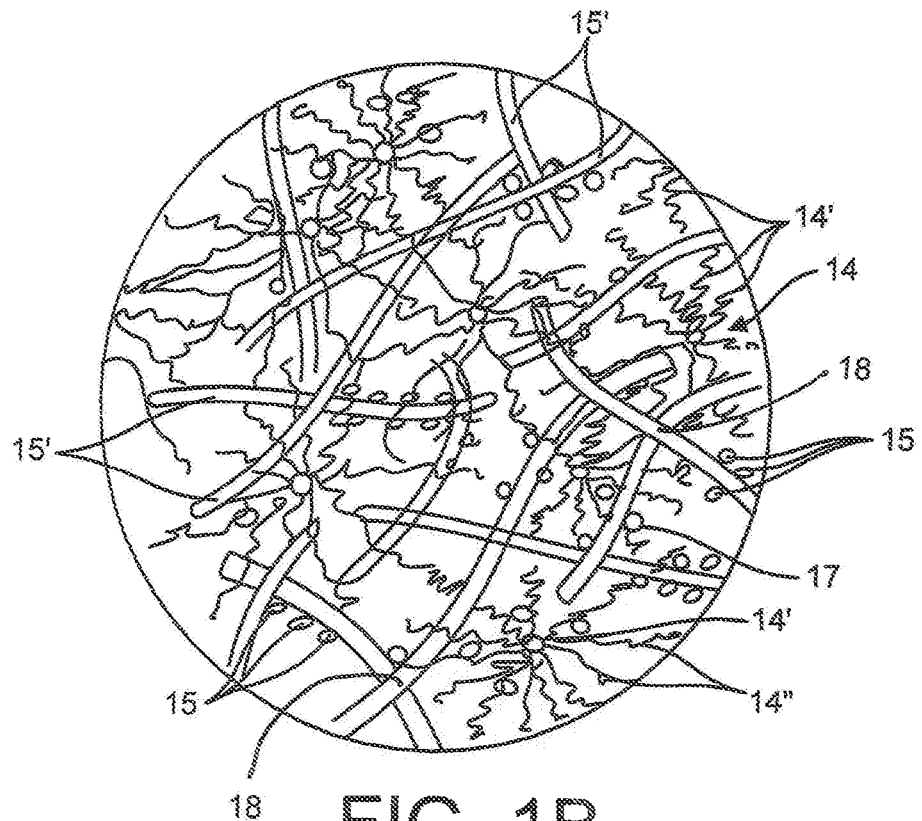
FIG. 1B is an enlarged view of a section of the down core and wherein the down cluster are trapped and bound together by heat-fused glue particles and elastomeric binding strands and the down tentacles of the clusters to form a stretchable down core.

FIG. 1B is an enlarged view illustrating the mixture of the down clusters 14 with a binder which is constituted by a mixture of the elastic glue particles 15 and the elastic polymer strands or filaments 15'. Each cluster 14 has a central quill point 14' with fluffy tentacles or filaments 14" projecting from its central quill point 14' in all directions creating a three dimensional structure which traps air to give down insulating ability. The clusters attach to one another by their tentacles 14" when plucked from the goose, duck or swan. As can be seen such as identified by reference numeral 17, some of the glue particles 15 that are melted bind to both the down clusters 14 and the elastic polymer filaments 15' and thus provide improved bonding of the elements in the mixture and entrapment of the down clusters preventing the down clusters from escaping from the side edges of the sheet 10. The filaments 15' or fibers act as carriers for the glue particles. As also denoted by reference numeral 18, the filaments 15' bind to themselves at their crossings and to the down tentacles 14'. Also, the tentacles 14' have a twisted shape and interconnect with the tentacles of adjacent clusters. The interconnections of the filaments, the stretchable glue and the tentacles of the down with one another form a homogeneous stretchable core sandwiched between the opposed multi-directional stretchable elastomeric sheets 12 and 13.

Figure 2:
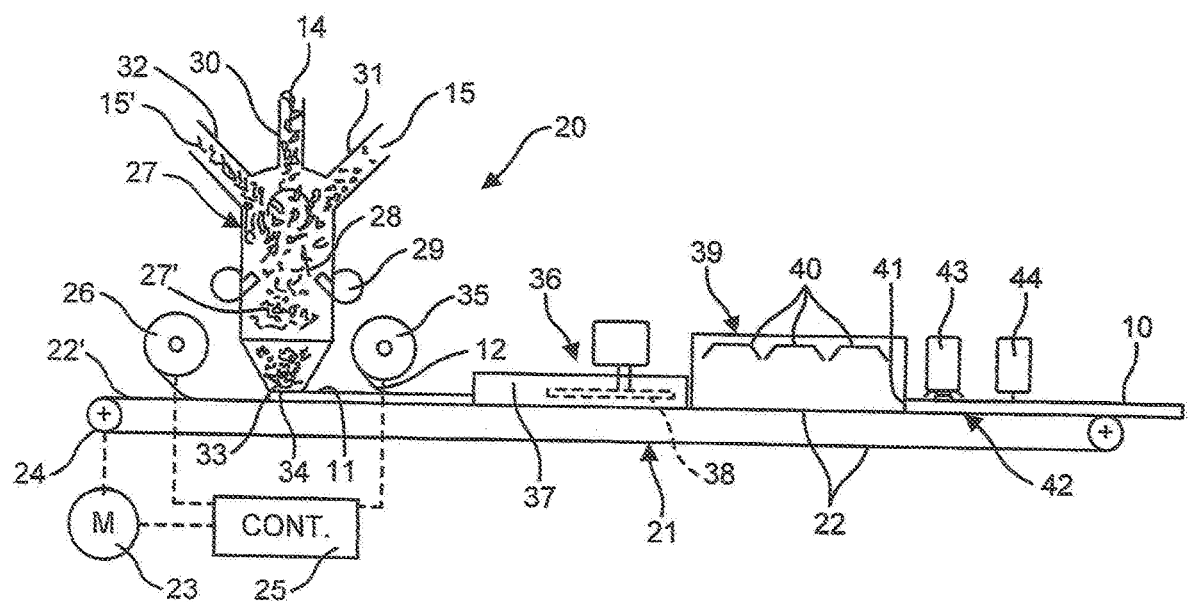
FIG. 2 is a schematic illustration showing a method of fabricating the thermally insulating stretchable down sheet using a binder having multi-directional elastic properties when heat fused and mixed with the down and held captive between opposed elastomeric sheets having multi-directional stretchability.

With reference now to FIG. 2 there is described a method of fabricating a thermally insulating stretchable down sheet 10 of the present invention. As herein shown, the machine 20 comprises a conveyor 21 having an endless belt 22 fabricated from a non-stick material and capable of withstanding heat up to at least 150 degrees C. The belt 22 extends through the machine length, as herein shown, although the conveyor may be constituted by two or more driven and aligned conveyor belt sections driven synchronized to one another. The belt is driven by a motor 23 coupled to a drive drum or sprocket 24, the speed of which is controlled by a controller device 25 whereby to control the thickness or density of the down core 11 deposited on the belt. The different operating parameters of the machine are programmed in the controller device and can be adjusted on the controller device or remote therefrom.

At the inlet end of the conveyor 21 there is supported a roll 26 containing a supply of the stretchable elastomeric sheet 13 which is dispensed on the top surface 22' of the conveyor belt at a speed synchronized with the speed of the conveyor belt 22. An air mixing chamber 27 is supported above the top run 22' of the conveyor and is preferably, although not exclusively, constructed of clear plastic whereby to view the operation therein of the air turbulence mixing action of the down feathers 14 with the binder glue particles and/or the stretchable fibers 15'. Air mixing currents 28 are injected at an upward angle inside the mixing chamber 27 by blowers 29, the air speed of which may be regulated by the controller settings. The down clusters 14 are fed into the mixing chamber 27 at a control rate via a feed chute 30. The dry elastic glue particles 15 and/or elastic filaments 15' are also fed to the mixing chamber 27 via a chute 31, there being from about 2% to 30% of filaments by weight of the mixture. The elastic glue particles are released in volume to comprise 2% to 30% by weight of the mixture with the down and preferably 6% to 15% by weight. Likewise, when the binder is a stretchable elastic filament 15', it is fed to the mixing chamber 27 via a separate chute 32. The stretchable elastic filaments may comprise 5% to 90% by weight of the mixture with the down to form a mostly polyester insulating sheet with reduced thermal insulating properties. Preferably, the down mixture is from about 10% to 25% by weight to form the down insulating sheet of the invention. The binder is preferably constituted by a blend of the elastic glue particles 15 and the stretchable or elastic filaments 15' in equal proportions or 30% filaments and 70% glue particles or variations thereof depending on the desired elastic properties. As an example, a 30 grams down insulating sheet 10 contains between 3 grams to 7.5 grams of the glue and filaments mixture, whereas a 100 grams down insulating sheet may contain 10 grams to 25 grams of the glue and filaments mixture. It is contemplated that to the mixture there may also be added other components in the form of chemical additives or fibers to provide fire retardants or to improve the tensile strength of the core.

The elastic glue binder as herein contemplated has a softening binding point above 80 degrees C. while the elastic filaments which are low molecular weight polymers may have a softening point slightly below 80 degrees C. As the down and binder mix in the upper part of the mixing chamber, the mixture starts to precipitate downwards to the lower part 27' of the chamber where a dispensing rotor 33 is rotated to dispense the mixture through a bottom depositing outlet opening 34 of the mixing chamber 27 at a constant volume onto elastomeric sheet 13. By controlling the speed of the conveyor belt, the thickness of the deposited mixture is controlled and this is accomplished by the conveyor speed setting in the controller 25.

Downstream of the mixing chamber there is supported a second roll 35 containing a supply of the multi-directional stretchable elastomeric sheet 12 which is applied on the top surface of the down core sheet 11 exiting its passage from under the mixing chamber 27. Optionally, a down core sheet restrainer device 36 may be supported across the conveyor belt 22 to restrain the down and bi-component stretchable mixture on opposed sides thereof by adjustable guide side walls 37 supported above and close to the top surface of the conveyor belt 22 to prevent the down mixture from escaping from the side edges thereof. The elastomeric stretchable sheet 12 restrains the top surface of the down mixture. Additionally, a top compression plate 38 may span across the conveyor belt above the down mixture to gradually compress the mixture if desired prior to entry into a thermal chamber 39. If it is desired to support the down and the binder mixture on the bottom elastomeric sheet only, then the second roll 35 of the elastomeric sheet is not necessary. However, to retain the down mixture in place the top compression plate 38 would act as a covering over the top surface of the down mixture with the binder. The down clusters are very unstable and are easily releasable into the air when not constrained. This is why the second roll 35 is positioned close to the outlet 34 in order to restrain the down as soon as possible after being deposited on the elastomeric sheet.

The thermal chamber 39 is of a predetermined length and provided with heating devices 40 capable of generating controlled heat in the thermal chamber in the range of from about 80 degrees C. to 160 degrees C. to melt the elastic glue 15 mixed with the elastic filaments 15'. At the outlet 41 of the thermal chamber exits the thermally insulating stretchable down sheet 10 and it may be conveyed along a cooling end section 42 of the conveyor 21 to cool the sheet 10. Alternatively, cooling air blowers 43 may be mounted above the exit end section 42 of the conveyor to provide for rapid cooling of the sheet 10. A suitable slitter device 44 can then sever the sheet into sections to form individual sheets or slit the sheet to provide the end of a roll of the down sheet.

Figure 3:
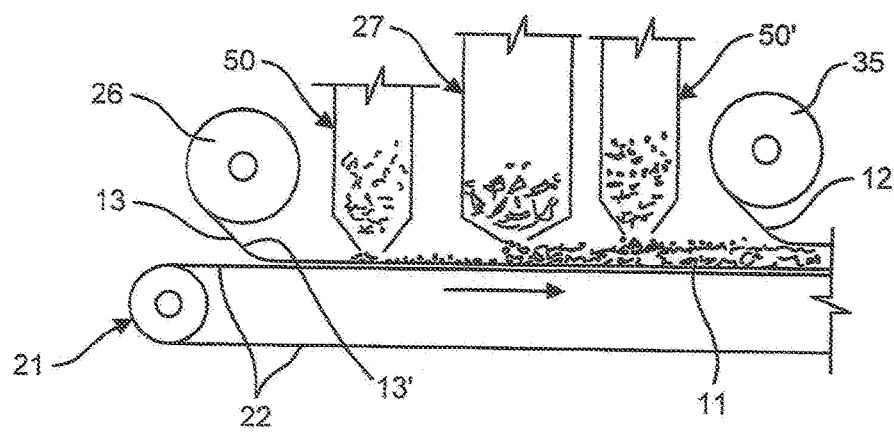
FIG. 3 is a schematic illustration showing a modification of FIG. 2 wherein a coating of a tackifier binder is applied between the down core and the outer elastomeric multi-directional stretchable sheets.

Referring now to FIG. 3 there is illustrated a further modification of the machine 20. As herein shown a tackifier or plasticizer applicator 50 and 50' may be positioned adjacent the entry end and exit end respectively of the mixing chamber 27 whereby to release a small quantity of a tackifier on the top surface 13' of the stretchable elastomeric sheet 13 and the top surface of the down mixture for the addition of stretchable adhesive. The tackifier may be constituted by the elastic glue particles or the elastomeric binding filaments or a combination thereof whereby to enhance the binding at the interfaces of the multi-directional stretchable elastomeric sheets 12 and 13 with the down feather core 11. This is particularly useful if the elastomeric sheets are constituted by netting which improves breathability and wherein the added tackifier further prevents the down clusters from being released through the interstices of the netting.

Figure 4:
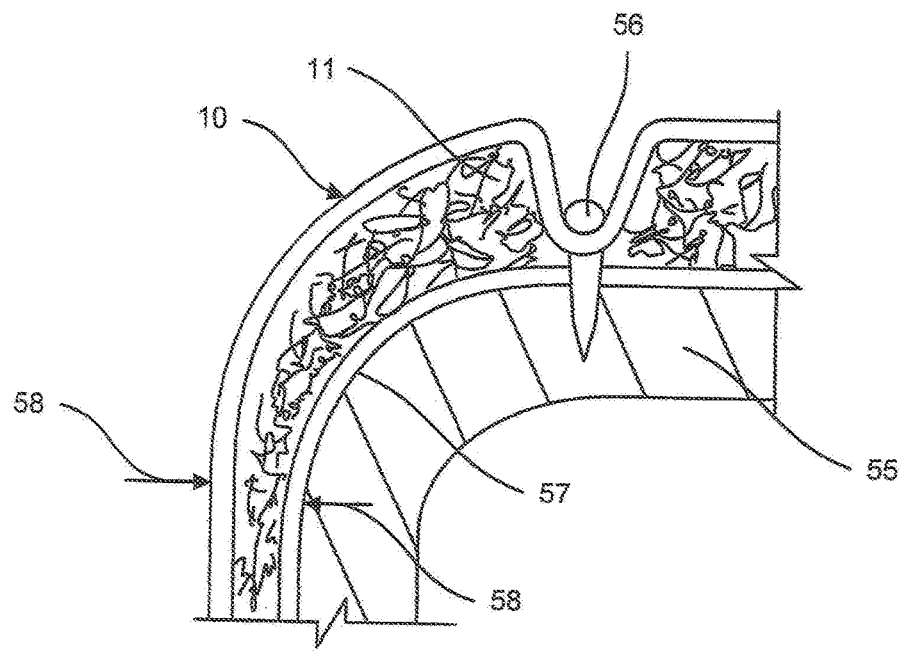
FIG. 4 is an enlarged and partly fragmented section view illustrating an application of the thermally insulating stretchable down sheet and wherein the sheet is stretched and secured to an irregular shaped member.

As shown in FIG. 4, because the thermally insulated down sheet 10 of the present invention has multi-directional stretchability it can be used in numerous insulating applications. As herein shown, the sheet is secured to a rigid curved body 55 by fasteners, one fastener 56 herein illustrated, and is stretched in a curved area 57 of the body 55 where the sheet 10 is stretched thereby stretching and compressing the core material 11 in the zone identified by arrows 58 and without fracturing the sheet due to its stretchability. Similarly, when the sheet 10 is sewn in articles of apparel the same stretching occurs in certain areas of the apparel where there is movement, stretching the insulation such as in arm pit areas of jackets, the knee areas of the legs of insulating pants, such as ski pants, etc. The breathability of the insulating stretchable down feather sheet 10 also provides for the passage of humidity and air flow when positioned in vent areas of certain articles of apparel or any area where such breathable feature is required. The thermally insulating stretchable down sheet can be secured to various elements by many types of securement means, such as glue, stitching, heat bonding, etc.

Figure 5:
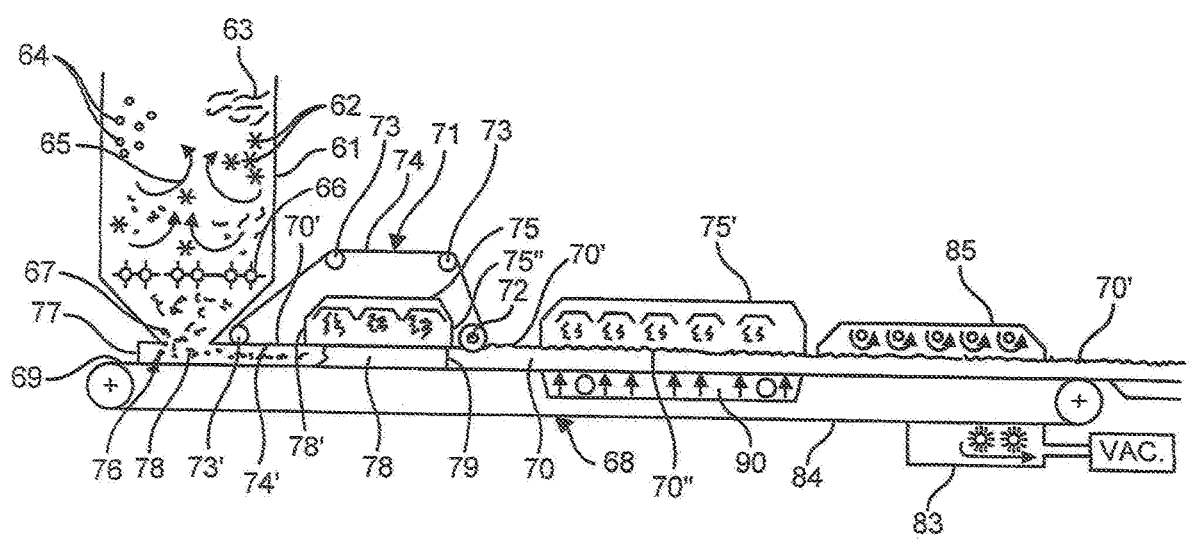
FIG. 5 is a block diagram illustrating an embodiment of another method of fabricating the homogeneous thermally insulating sheet of the present invention formed by a down core structure without the use of scrim sheets on opposed surfaces of the core structure.
Figure 6:
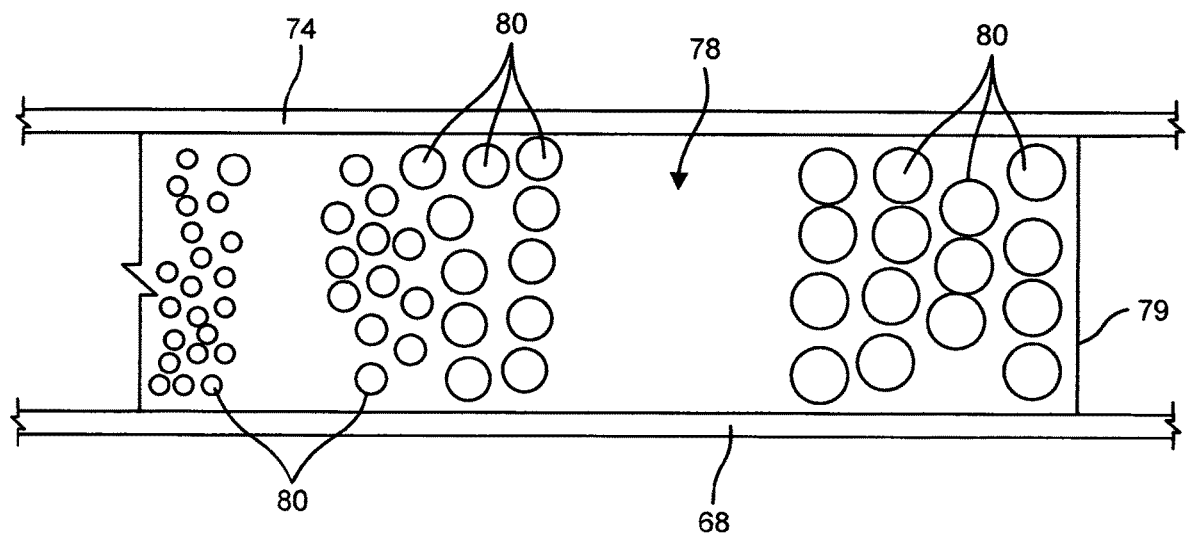
FIG. 6 is an enlarged view of the section of the side plates extending into the inlet section of the thermal chamber and which progressively exposes the side surfaces of the sheet mixture of the down feather material with the binder material.
Figure 7:
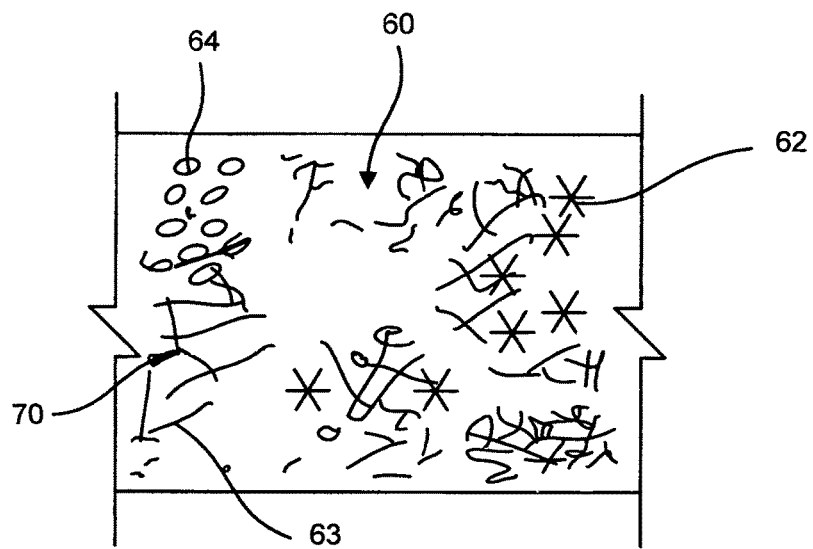
FIG. 7 is a fragmented side view illustrating the thermally insulating sheet formed solely by a down core structure.

Referring now to FIGS. 5 to 7 there will be described the method and the apparatus for the fabrication of a thermally insulating sheet 60, as shown in FIG. 7 comprised solely of a down feather mixture mixed with binder material. There are no scrim sheets as above described to retain the down and binder material mixture during the process and on the finish product. FIG. 5 illustrates the method of fabricating the homogeneous insulating sheet 60 of FIG. 7, formed solely of a down core structure. The method comprises a mixing chamber 61 in which down feather material comprised mainly of down clusters 62 and tiny feathers mixed with a binder agent or material in the form of binding fibers 63 and/or glue particles 64 mixed in predetermined proportions. The mixing is made by a mixing air flow 65 and mixing rolls 66 disposed above an outlet opening 67 of said mixing chamber 61. The mixture is discharged at the outlet opening 67 at a predetermined rate. A conveyor belt 68 having a non-stick outer surface 69, such as a TEFLON, registered trademark, coated surface, is displaced under the outlet opening 67 at a predetermined speed to receive thereon the down cluster and binding material mixture to form a sheet core layer 70. The speed of travel of the conveyor belt 68 determines the thickness of the deposit from the mixing chamber.

Mixture restraining means is provided in the immediate area of the outlet opening 67 to restrain the mixture of unstable down clusters 66 mixed with binding fibers 63 and/or glue particles 64. This restraining means is constituted by a mixture restraining endless belt assembly 71 driven at the same speed as the conveyor belt 68 and trained about a drive pulley 72 and idle pulleys 73. The restraining endless belt 68 also has a non-stick outer surface 74 and it is supported for engagement with a top surface 70' of the sheet layer 70 deposited on the conveyor belt 68. As shown, the restraining endless belt 68 has a forward guide pulley 73' positioned close to the outlet opening 67 to immediately engage with the top surface of the sheet layer 70 exiting the outlet opening 67. It also has a long mixture restraining belt section 74' to restrain the down feather and binder mixture sheet layer 70 has it travels through a first heat treatment chamber 75. The restraining endless belt 68 is also a perforated belt having tiny holes therein to permit heat transfer from the heat treatment chamber 75 to at least the top surface of the sheet layer mixture 70. The belt could also be heated instead of being perforated to heat the top surface of the sheet layer mixture 70. The entire mixture restraining belt assembly 71 is adjusted vertically depending on the desired thickness of the sheet layer 70 required at the outlet of the heat chamber 75.

The mixture restraining means also comprises a restraining side wall structure 76 formed about the outlet opening 67. It has an end wall 77 and opposed parallel side walls 78 which extends along the conveyor 68 closely spaced to the outer surface 69 of the conveyor to retain the sheet layer mixture 70 captive from the sides. The end wall 77 may not be necessary but it prevents the unstable down clusters in the mixture from escaping from under the outlet opening 67. Accordingly, the deposited mixture, in the form of a sheet layer, is held captive at the bottom by the conveyor belt 68, at the side surfaces 70" by the parallel side walls 78 of the restraining side wall structure 76 and the top by the restraining endless belt 71.

As shown in FIGS. 5 and 6, the side walls 78 extend within the heat treatment chamber and terminate at an end 79 close to the exit end 75" of the thermal chamber 75. The side walls 78 are also perforated with holes 80 from the inlet end 78' of the heat treatment chamber 75 to the end 79 of the side walls. The holes 80 progressively increase in size from the inlet end to the outlet end of the chamber, as illustrated, whereby the outer side surfaces of the sheet layer mixture 70 is progressively exposed to the heat from the heat treatment chamber to progressively expose the mixture to the heat to prevent the small clusters from escaping through the holes 80, for example if the holes where too large at the end 78'. The perforated restraining endless belt 71 also causes the heat to better penetrate to the top surface of the sheet layer mixture 70 to sufficiently bind the mixture at the top surface. Accordingly, when the sheet layer 70 exits the heat treatment chamber 75 the exposed outer surfaces of the sheet layer mixture 70 are substantially heat fused to prevent the clusters, fibers and glue particles to be released during its travel to the second section 75' of the heat treatment chamber or a further heat chamber where the sheet layer mixture 70 is subject to sufficient heat treatment, in the range of from about 80 degrees C. to 160 degrees C., to cause the low melting point fibers to soften and bind together at their crossing and to the down clusters to bind all of the mixture material together inside the core to form a homogeneous core mixture 70' which is then conveyed through a cooling chamber 85. It is also conceivable that the temperature of the first thermal section 75 be sufficiently high to quickly fuse the outer surfaces of the mixture conveyed therethrough, say slightly above 160 degrees C.

Because the top surface 70' and the opposed side surfaces 70" are subjected to two heat treatments, more bonding or fusing will occur at those surfaces to produce a higher density bond than the inside of the core. Such is very desirable to prevent the down from escaping from the outer surfaces. With regards to the bottom surface of the down core sheet it is contemplated that it could be heated through the conveyor belt as it travels through the second thermal chamber 75' from under the belt by a pressurized heat chamber blowing hot air upwards to heat the conveyor belt and hence the bottom surface of the sheet layer mixture 70. A scrim sheet can also be bonded to the bottom surface of the down core as shown in FIGS. 1A, 2 and 3.

Although FIG. 5 illustrates the heat treatment chamber being formed in two sections 75 and 75', the thermal chamber can be a single chamber and wherein the restraining endless belt 71 is caused to exit the chamber through a slit formed in the top wall of the thermal chamber. As also shown in FIG. 5, a belt surface cleaning apparatus 83 is mounted along the bottom travel path 84 of the conveyor belt 69 to brush off or scrape any residue material that may be stuck to the outer non-stick surface 69 and to convey such by vacuum to a collection reservoir.

The above description of the preferred embodiment is intended to cover equivalent modifications of the specific examples described herein provided such equivalent modifications fall within the scope of the appended claims.

The invention claimed is:

1. A method of fabricating a homogeneous thermally insulating sheet formed by a down core structure, said method comprising the steps of:
   i) mixing in a mixing chamber down feather material, comprised essentially of down clusters, with a binding material in predetermined proportions to form a mixture of down feather material, said binding material being comprised of glue particles and/or polymer fibers having a low melting point in the range of from about 80 degrees C. to 160 degrees C.;

ii) displacing a conveyor belt having a non-stick outer surface under an outlet opening of said mixing chamber;

iii) releasing predetermined quantities of said mixture of down feather material and binding material from said outlet opening onto said non-stick surface of said conveyor belt when said conveyor belt is in motion to form a sheet layer of said mixture, said sheet layer having top and bottom surfaces and opposed side surfaces:

iv) restraining said opposed side surfaces of said mixture of down feather material as it is conveyed away from said outlet opening of said mixing chamber and into a thermal chamber wherein to bond said top and bottom surfaces and opposed side surfaces of said mixture of down feather material as it is conveyed through said thermal chamber, said restraining of opposed side surfaces being comprised by side plates being immovably secured to each side of said conveyor belt above said non-stick surface and extending into an inlet end of said thermal chamber where said side plates have holes of gradually increasing size from said inlet end to an outlet end of said thermal chamber to progressively expose substantially all of said opposed side surfaces of said mixture of down feather material and binding material as it is conveyed through said thermal chamber to prevent escapement of said down dusters from said mixture of down feather material, and v) releasing said restrainment of said mixture of down feather material after said mixture has been heat set to prevent the escapement of down clusters which is an unstable material.

2. The method as claimed in claim 1 wherein said mixture restraining belt is a perforated restraining belt which extends through said thermal chamber, said perforated restraining belt providing for heat transfer from said thermal chamber to a top surface of said mixture of down feather material with said binding material.

3. The method as claimed in claim 1 wherein there is further provided the step of cleaning any residual deposits of said down feather mixture on said non-stick surface of said conveyor belt has said conveyor belt is displaced along a bottom travel path thereof.

4. The method as claimed in claim 1 wherein said step (i) comprises mixing in said mixing chamber about 2% to 30% by weight of said polymer fibers and 2% to 30% by weight of said glue particles with said down feather material comprised essentially of down clusters.

5. The method as claimed in claim 1 wherein said step (iv) comprises displacing a non-stick surface of a mixture restraining belt over a top surface of said mixture as it is conveyed away from said outlet opening and into said thermal chamber.

6. The method as claimed in claim 1 wherein there is a further thermal chamber immovably secured to each side of said conveyor belt above said non-stick surface and extending into an inlet end of said thermal chamber where said side plates have holes of gradually increasing size from said inlet end to an outlet end of said thermal chamber to progressively expose substantially all of said opposed side surfaces of said mixture of down feather material and binding material as it is conveyed through said thermal chamber to prevent escapement of said down dusters from said mixture of down feather material and v) releasing said restrainment of said mixture of down feather material after said mixture has been heat set to prevent the escapement of down clusters.

7. The method as claimed in claim 1 wherein there is provided a further thermal chamber disposed behind said outlet opening of said thermal chamber where said mixture is subjected to further heat treatment to penetrate inside the core of said mixture and therefore producing a down core structure wherein the top and opposed side surfaces have a higher bond density than the inside of the core.

8. The method as claimed in claim 7 wherein there is further provided the step of cooling said heat fused core as it exits said further thermal chamber.

9. The method as claimed in claim 8 wherein there is provided the step of releasing said mixture restraining belt from said top surface of said mixture as it exits said further thermal chamber.

\* \* \* \* \*